United States Patent [19]
Lee et al.

[11] Patent Number: 5,353,881
[45] Date of Patent: * Oct. 11, 1994

[54] COUNTER-ROTATING TWIN SHAFT SYSTEM FOR GARDENING MACHINES

[76] Inventors: Kai S. Lee; Esther W. Lee, both of 5235 Raborn, Kalamazoo, Mich. 49009

[*] Notice: The portion of the term of this patent subsequent to Apr. 7, 2009 has been disclaimed.

[21] Appl. No.: 88,152

[22] Filed: Jul. 6, 1993

Related U.S. Application Data

[63] Continuation-in-part of Ser. No. 789,063, Nov. 7, 1991, Pat. No. 5,224,552, which is a continuation-in-part of Ser. No. 672,380, Mar. 20, 1991, Pat. No. 5,101,911.

[51] Int. Cl.⁵ .............................................. A01B 33/02
[52] U.S. Cl. ...................... 172/52; 172/113; 172/116; 172/121; 172/123; 37/250; 56/13.7; 56/16.9; 74/425; 74/427
[58] Field of Search ...................... 172/48, 35, 36, 49, 172/52, 57, 60, 42, 100, 112, 113, 114, 116, 118, 119, 121, 123; 37/249–252, 260, 261; 56/13.7, 10.4, 251, 320.2, 16.9; 74/665 GE, 425, 427, 665 H, 397, 399; 474/101, 110

[56] References Cited

U.S. PATENT DOCUMENTS

| | | | |
|---|---|---|---|
| 870,665 | 11/1907 | Colgren | 74/724 |
| 1,240,542 | 9/1917 | Cassell . | |
| 1,533,626 | 4/1925 | Wilson et al. | 74/724 |
| 2,513,186 | 6/1950 | Leaman . | |
| 2,612,094 | 9/1952 | Drozinski . | |
| 3,128,831 | 4/1964 | Arndt | 172/123 |
| 4,018,105 | 4/1977 | Walker | 74/665 GE |
| 4,402,366 | 9/1983 | Dankel | 172/43 |
| 4,452,316 | 6/1984 | Edwards | 172/41 |
| 4,481,757 | 11/1984 | Tsuchiya | 56/16.9 |
| 4,483,400 | 11/1984 | Arndt | 172/42 |
| 4,519,459 | 5/1985 | Reaume | 172/42 |
| 4,620,599 | 11/1986 | Zinck | 172/42 |
| 4,754,660 | 7/1988 | Kobayashi et al. | 74/724 |
| 4,905,460 | 3/1990 | Toman | 56/12.7 |
| 4,979,573 | 12/1990 | Williamson | 172/15 |
| 5,048,617 | 9/1991 | Haven | 172/42 |
| 5,101,911 | 4/1992 | Lee et al. | 172/48 |
| 5,224,552 | 7/1993 | Lee et al. | 172/52 |

FOREIGN PATENT DOCUMENTS

| | | | |
|---|---|---|---|
| 1518471 | 7/1978 | United Kingdom | 56/13.7 |

*Primary Examiner*—Randolph A. Reese
*Assistant Examiner*—Spencer Warnick
*Attorney, Agent, or Firm*—Price, Heneveld, Cooper, DeWitt & Litton

[57] ABSTRACT

A gardening utility machine having a counter-rotation twin shaft system can perform multiple types of work required for gardening (tilling, soil removal, weeding, raking and shredding of leaves), snow/ice removal and for power de-thatching and mowing of lawn grass. This can be done by exchanging attachments on the counter-rotating twin shafts: if tines are installed on the twin shafts, soil tilling, weeding can be done; if auger blades with or without digging bits are in place instead, the machine can simultaneously till and remove soil or can remove ice/snow, or rake and shred leaves; if the front shaft is installed with a spiked roller and the rear shaft, a shearing reel, then the machine can power de-thatch and mow grass at the same time, and additional grass clipping mulching ability can be performed if a fan blower equipped with a mulching fan blade and a retractable bedknife is in place.

23 Claims, 10 Drawing Sheets

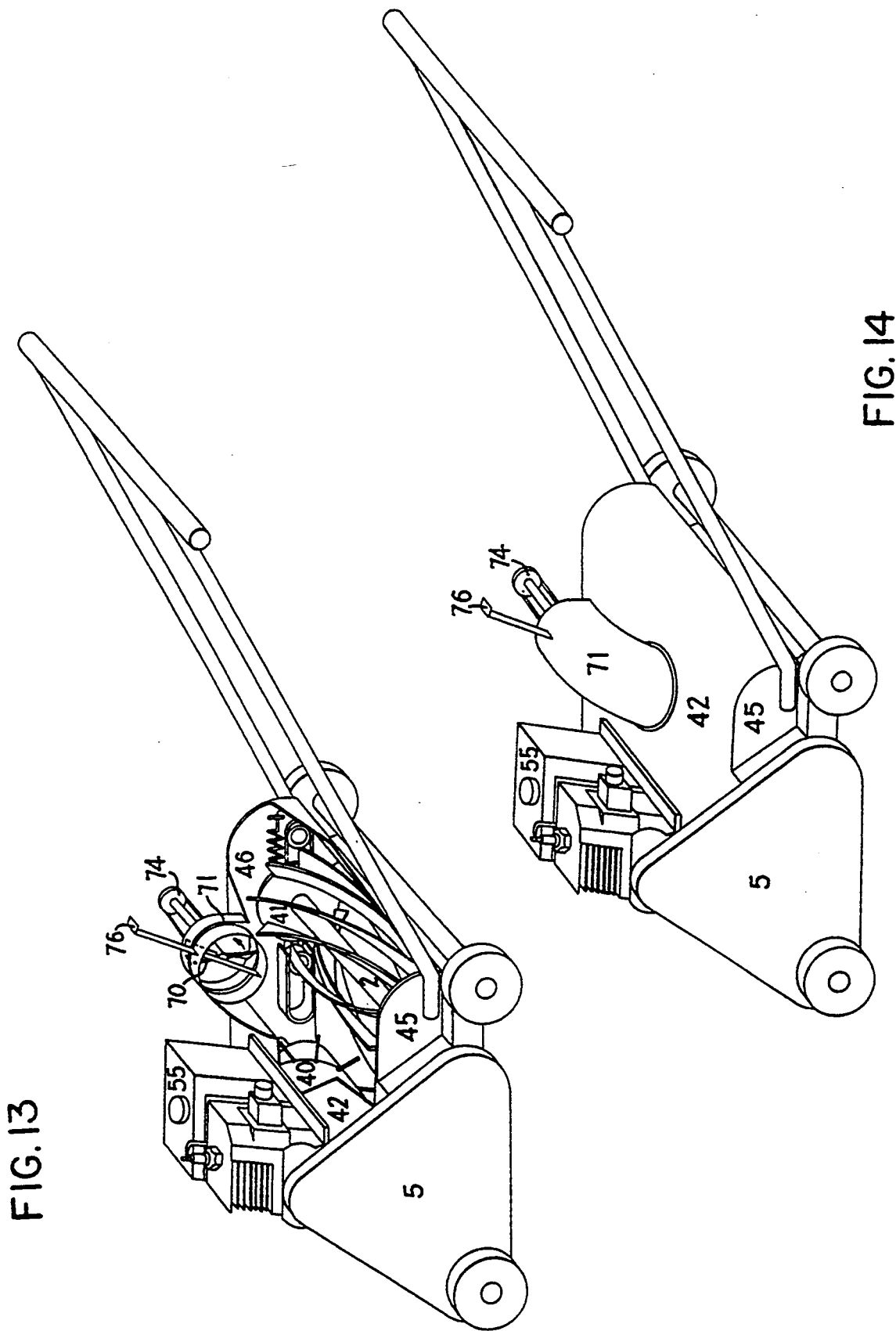

COUNTER-ROTATING TWIN SHAFT SYSTEM FOR GARDENING MACHINES

CROSS-REFERENCE TO RELATED U.S. PATENT APPLICATIONS

This application is a continuation-in-part of U.S. Ser. No. 07/789 063, filed Nov. 7, 1991 and now U.S. Pat. No. 5,224,552, issued Jul. 6, 1993 and which is a continuation-in-part of U.S. Ser. No. 07/672,380, filed Mar. 20, 1991, and now U.S. Pat. No. 5,101,911, issued Apr. 7, 1992.

BACKGROUND OF THE INVENTION

The present invention relates to soil cultivating apparatus in which soil working implements are affixed to driven shafts and reciprocating inserted and removed out of the soil at predetermined intervals as the apparatus is advanced along the ground.

OBJECTS OF THE INVENTION

An object of the present invention is to provide an improved counter-rotating twin shaft system for gardening machines.

A second object of the present invention is to provide an improved tine design for use in gardening machines.

A further object of the present invention is to provide an improved disengagement mechanism for a counter-rotating twin shaft system for gardening machines.

The above and other objects, advantages and features of the present invention will become more readily appreciated and understood when taken together with the following detailed description in conjunction with the accompanying drawings.

SUMMARY OF THE INVENTION

In accordance with the present invention, there is provided an improved counter-rotating twin shaft system for gardening machines in which counter rotation is achieved between two shafts by use of a wormgear or a drive belt. Soil working implements are affixed to the shafts to effect soil cultivation. A novel disengagement mechanism and tine design that can be used in conjunction with the inventive counter-rotating twin shaft system enable the system to be used in gardening machines which can be operated easier, safer and more efficiently.

Also shown is the rear shaft rests on sliding tracks having a spring mechanism for pulling the rear shaft towards the rear. Further shown are the twin shafts removed from the housing.

Figure 9:
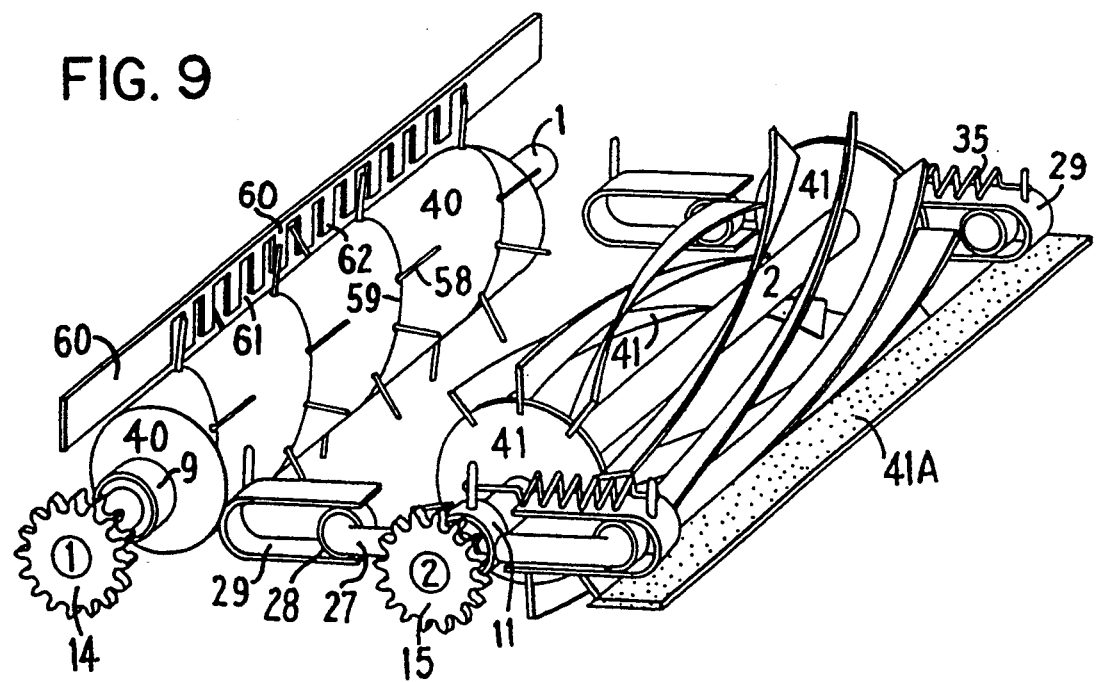
Figure 10:
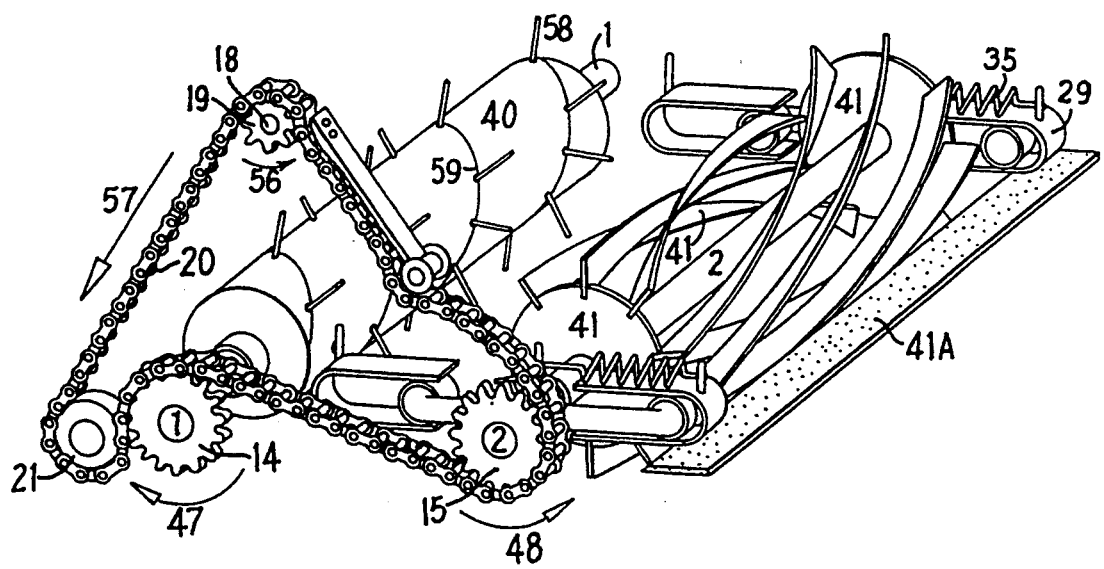

FIGS. 9 and 10 show a spiked roller at front and a shearing reel with bedknife at rear, all properly installed on the shafts relative to the positions of the other components.

Figure 11:
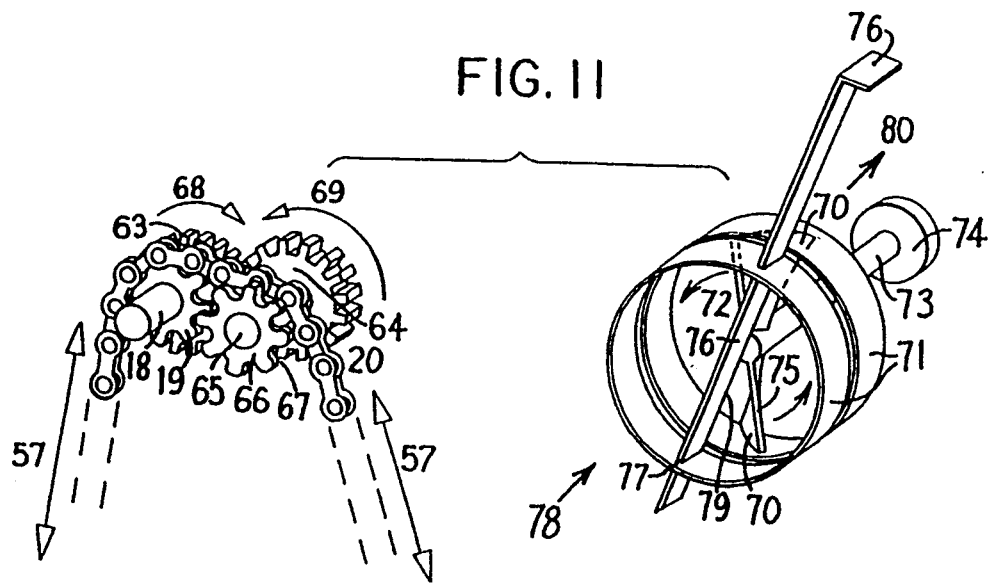

FIG. 11 shows a gear mechanism for reversing the direction of counter-rotation (left) and a fan blower with a shearing fan blade and bedknife for suction and for grass mulching (right).

Figure 12:
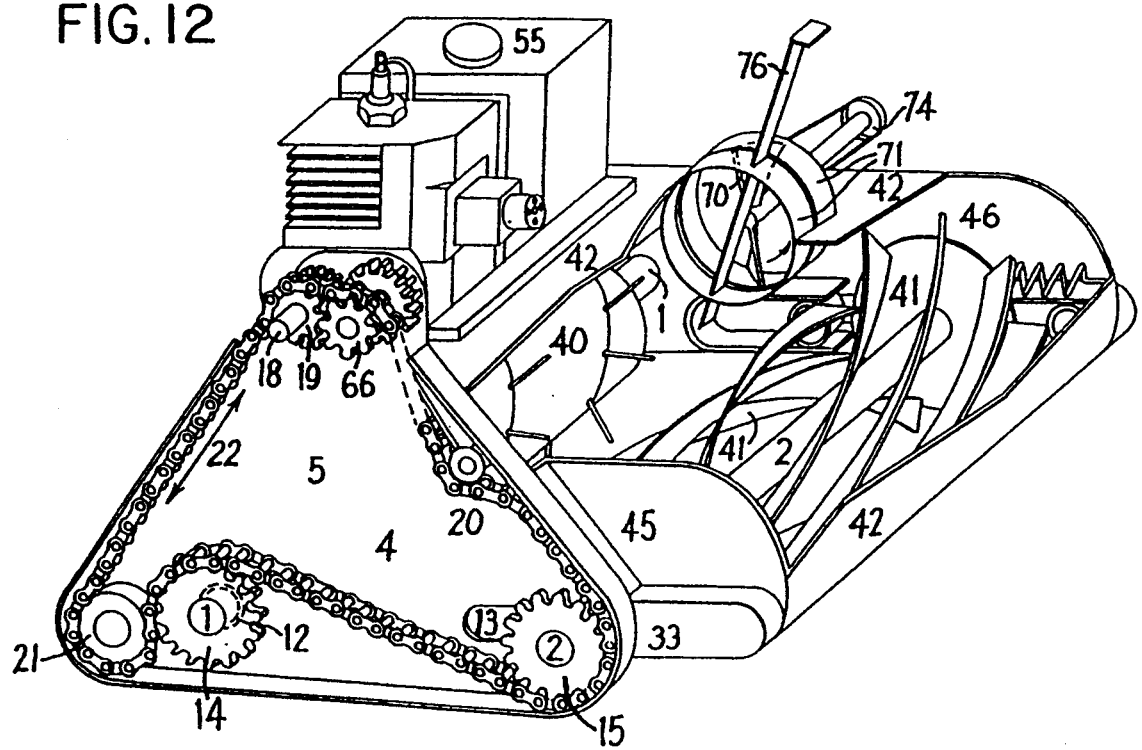

FIGS. 12 and 13 show the complete machine with cut-outs, revealing all components properly installed with or without wheels and guide handles.

FIG. 14 is an outside view of the machine.

Figure 15:
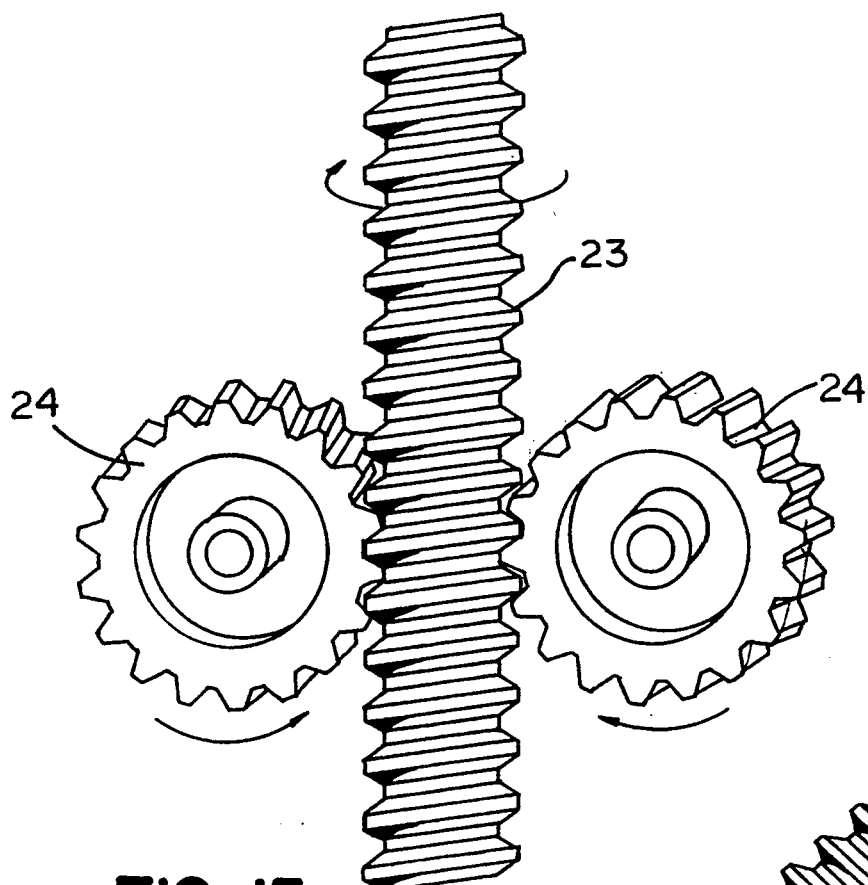
Figure 16:
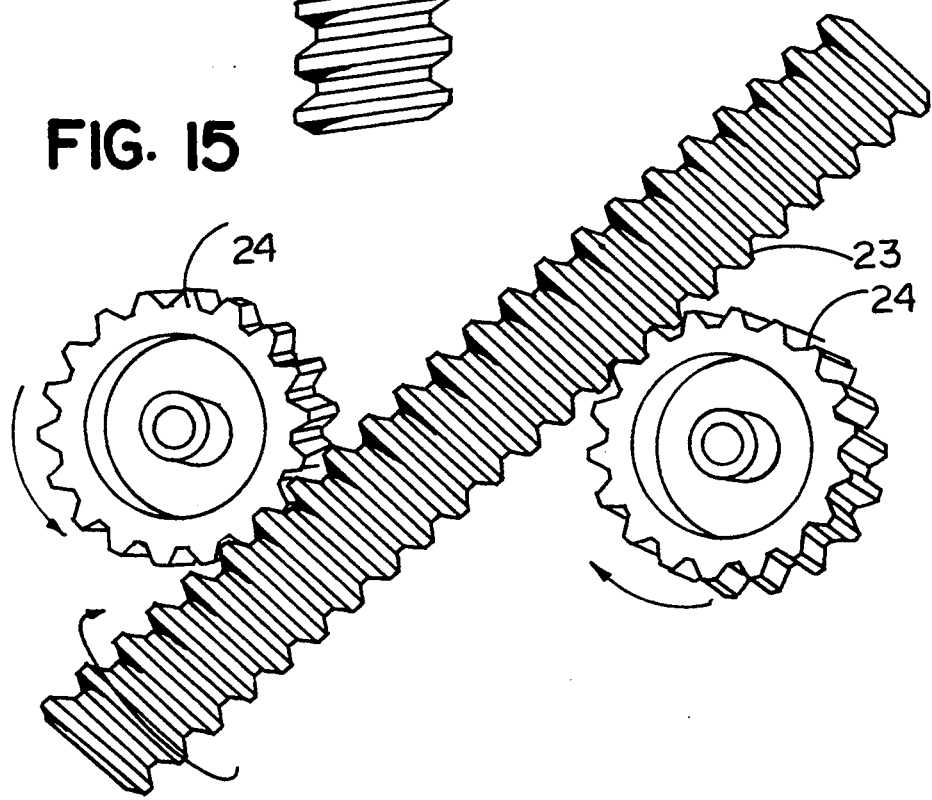

FIGS. 15 and 16 illustrate different ways of driving both shafts directly through worm and wormgear coupling.

Figure 17:
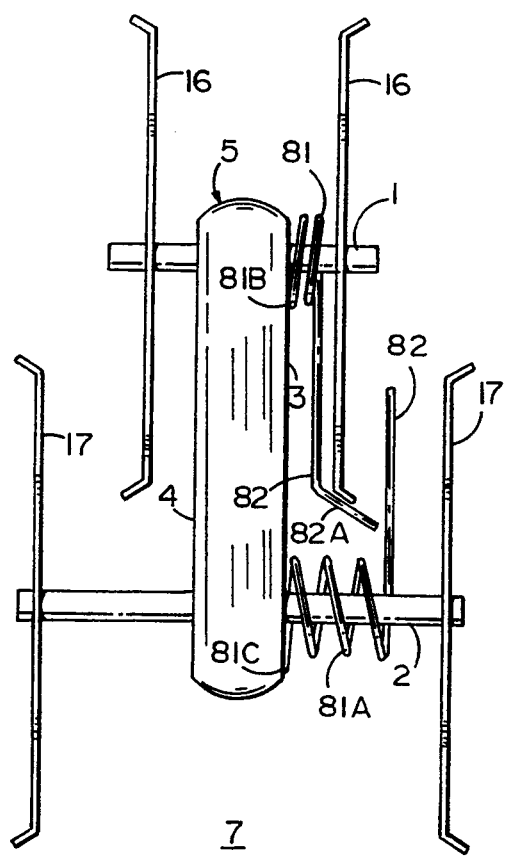

FIG. 17 is a plan view of the machine utilizing the novel disengagement mechanism.

Figure 18:
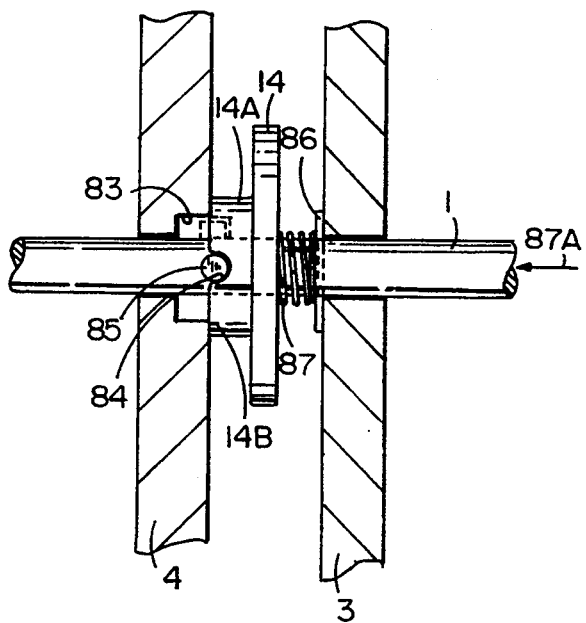

FIG. 18 illustrates the engaged position of the novel disengagement mechanism.

Figure 19:
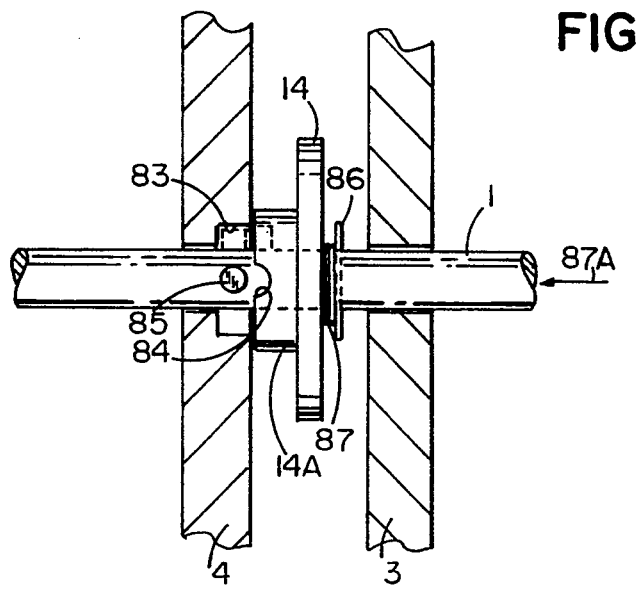

FIG. 19 illustrates the disengaged position of the novel disengagement mechanism.

Figure 20:
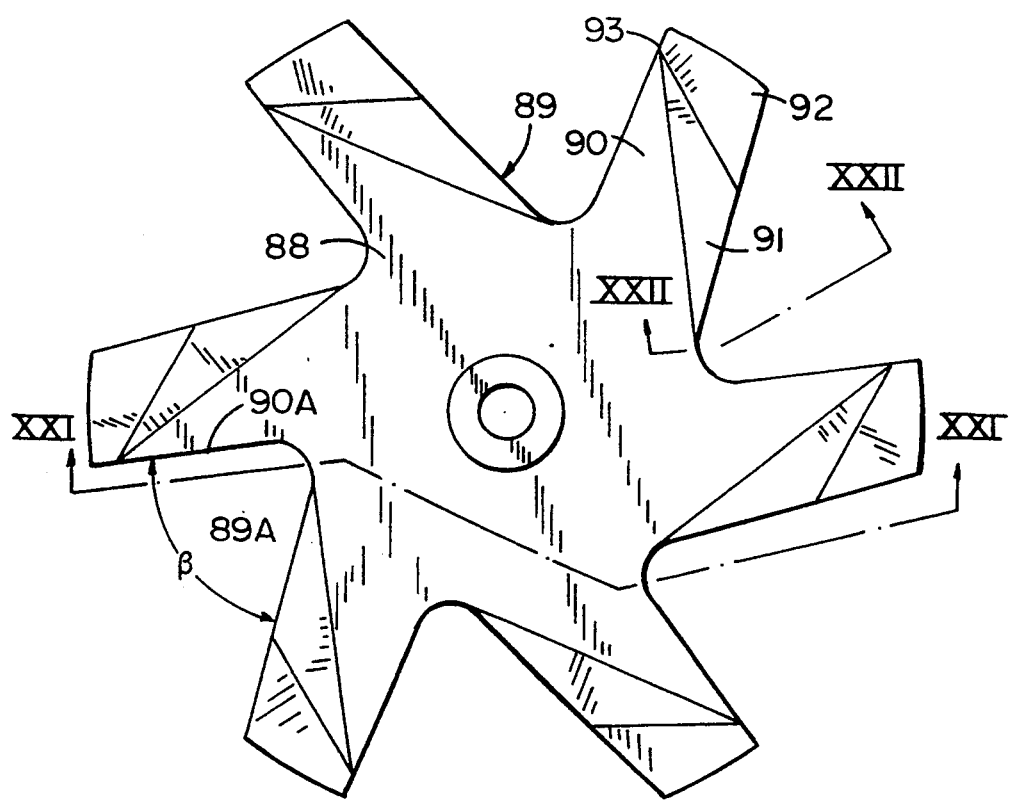

FIG. 20 is a plan view of a novel tine for use with the present invention.

Figure 21:
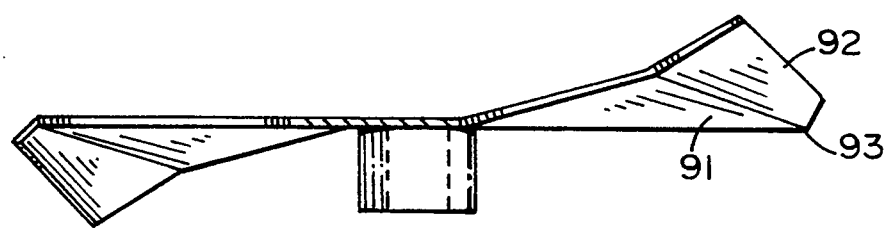

FIG. 21 is a sectional view along section line 21—21 in FIG. 20 illustrating the tine arm orientation.

Figure 22:
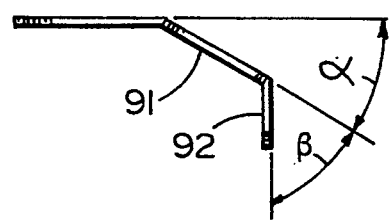

FIG. 22 is a partial side view of a tine arm.

DETAILED DESCRIPTION OF THE INVENTION

FIGS. 1 through 6 show the twin shafts 1, 2, being mounted transversely thereof on the walls 3, 4 of a transmission box 5. Shaft 1 is mounted forwardly at 6 and shaft 2, positioned parallel lengthwise, is mounted rearwardly at 7.

Shaft 1 rotates in a first direction 8 freely on a ball bearing 9, provided at each side wall 3 and 4, and shaft 2 rotates in a second direction 10 freely on a similar ball bearing 11, provided at each side wall 3 and 4. At left, viewed from the rearward direction 7, the shafts 1, 2 extend through apertures 12, 13 respectively in the side walls 3 and 4 into the bottom portion of a triangularly shaped transmission box 5, with aperture 13 being elongated horizontally. Inside the transmission box 5, shaft 1 and 2 respectively fit through the center opening of sprockets 14 and 15, which both have a similar diameter. Rotation of sprockets 14, 15 cause an exact rotation of respective shafts 1 and 2 and the tines 16, 17 affixed thereupon.

At the top of said transmission box 5 and generally parallel to shafts 1, 2, is a drive shaft 18 that can be readily coupled to an engine. The drive shaft 18 terminates in a smaller chain sprocket 19. All the sprockets 14, 15, 19 are linked together by a drive chain 20. To create counter-rotational movement between sprockets 14 and 15, the drive chain 20 winds circumferentially around the opposite sides of sprockets 14, 15. Therefore, viewing the left side of the machine from behind 7, the drive chain 20 winds around the teeth of sprocket 15 at the top, right, bottom and lower left circumference thereof, and then reverses its direction by winding around the teeth on the opposite side of sprocket 14 at its top, left and lower left circumference. In order to keep the chain 20 firmly engaged with sprocket 14 at all times, a pulley idler 21 is used to hold the chain 20 in place against the left and lower left circumference of sprocket 14. The pulley idler 21 is rotatably mounted on the side walls 3, 4 of transmission box 5. After chain 20 leaves the pulley idler 21, it engages with sprocket 19 of the engine drive shaft 18 for completion of a drive cycle 22. This way, a clockwise rotation of the engine drive shaft 18 will drive the rearwardly mounted shaft 2 and its two tines 17 to rotate clockwise 10 and the forwardly mounted shaft 1 and its two tines 16 will rotate in the exact opposite direction, counter-clockwise 8, thus causing the tines 16 to move towards tines 17 at the ground level, and vice versa. Likewise, if the engine drive shaft 18 rotates in a counter-clockwise direction, the tines 16 and 17 will move away from each other at the ground level.

Sprockets 14, 15 can also be driven in counter-rotation to each other by providing tensioners 30, 31 in contact with drive chain 20 in such a manner that the drive chain 20 contacts sprockets 14, 15 on their same sides, that is, on their forward, rearward, top or bottom sides. However, this method of driving sprockets 14, 15 is not believed to be as satisfactory as the method discussed above.

Figure 1:
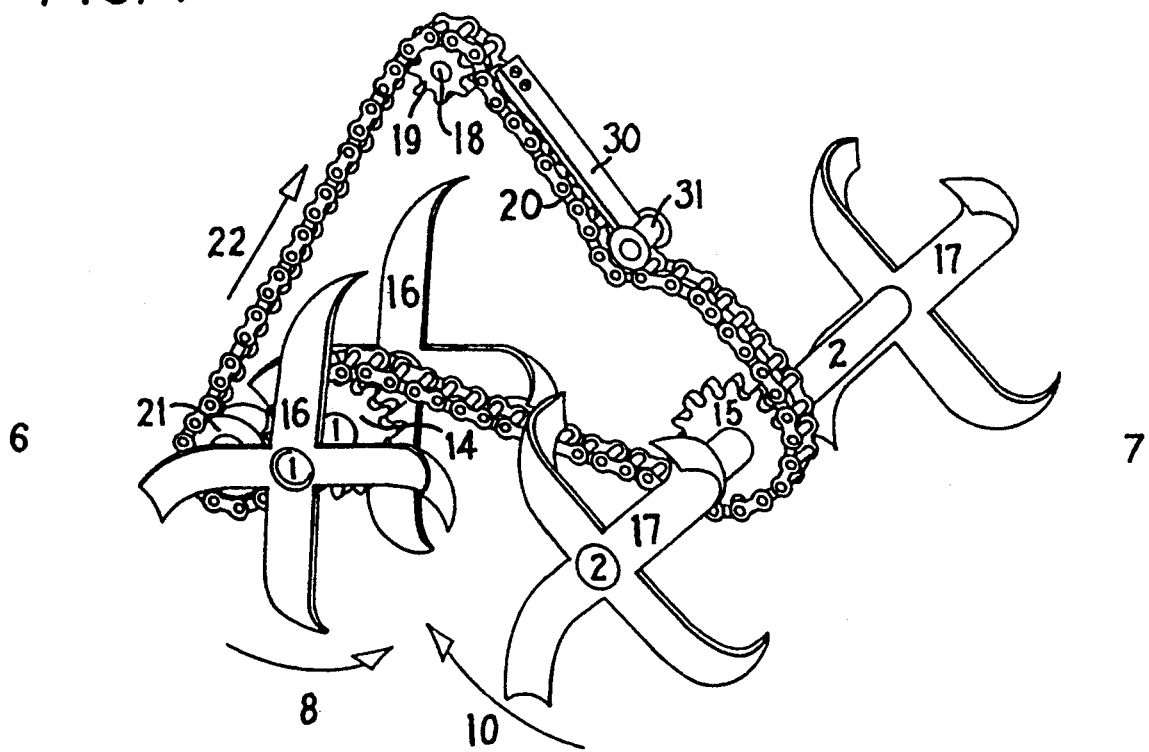
FIG. 1 is a 60 degree angle view of the tines and twin shafts connected by the sprockets and the drive chain.
Figure 2:
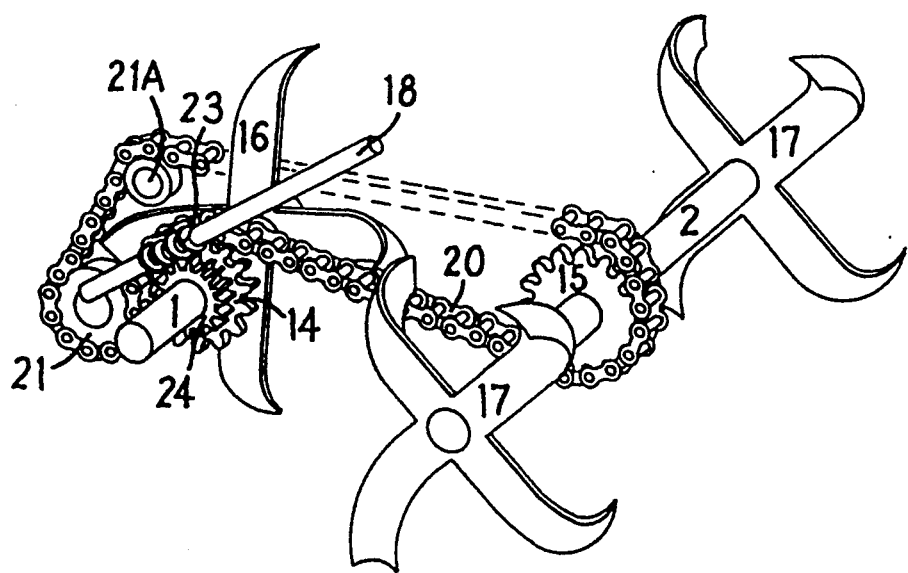
FIG. 2 shows the engine drive shaft that drives the front shaft directly through a worm and wormgears coupling.
Figure 3:
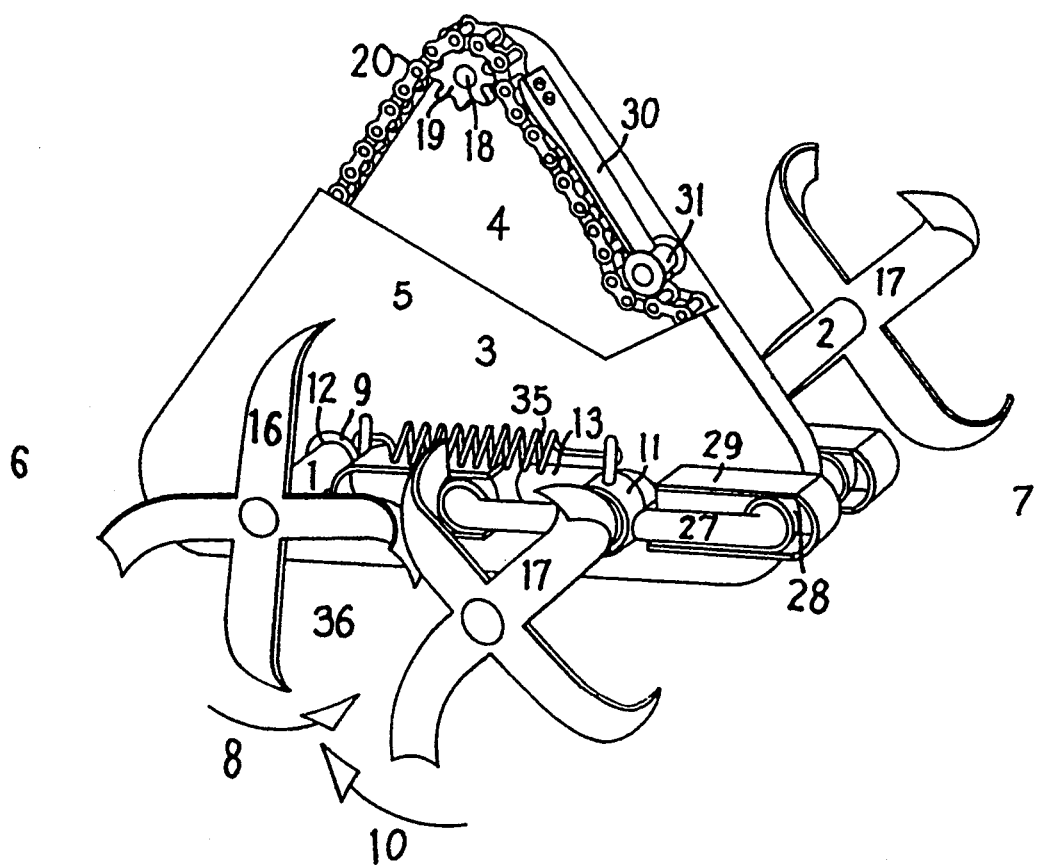
FIG. 3 is a view of the sprockets and drive chain housed inside the transmission box with cut-outs. Also shown on the transmission box are the sliding tracks.

In another embodiment, the engine drive shaft 18 can directly drive either shaft 1 or shaft 2. This can be done, for example, by installing on the engine drive shaft 18, a worm 23 that is engaged with wormgears 24 on shaft 1 (FIG. 2). This would transmit power directly to one of the twin shafts and would eliminate sprocket 19, but may require an additional pulley idler 21A.

Alternatively, as shown in FIGS. 15 and 16, worm 23 can directly engage with wormgears 24 provided on shafts 1, 2 to transmit power directly to each of twin shafts 1, 2 and effect counter-rotation thereof. The engine drive shaft can be provided in either a vertical orientation, as shown in FIG. 15, or an inclined orientation, as shown in FIG. 16, to effect the driving of wormgears 24.

Figure 4:
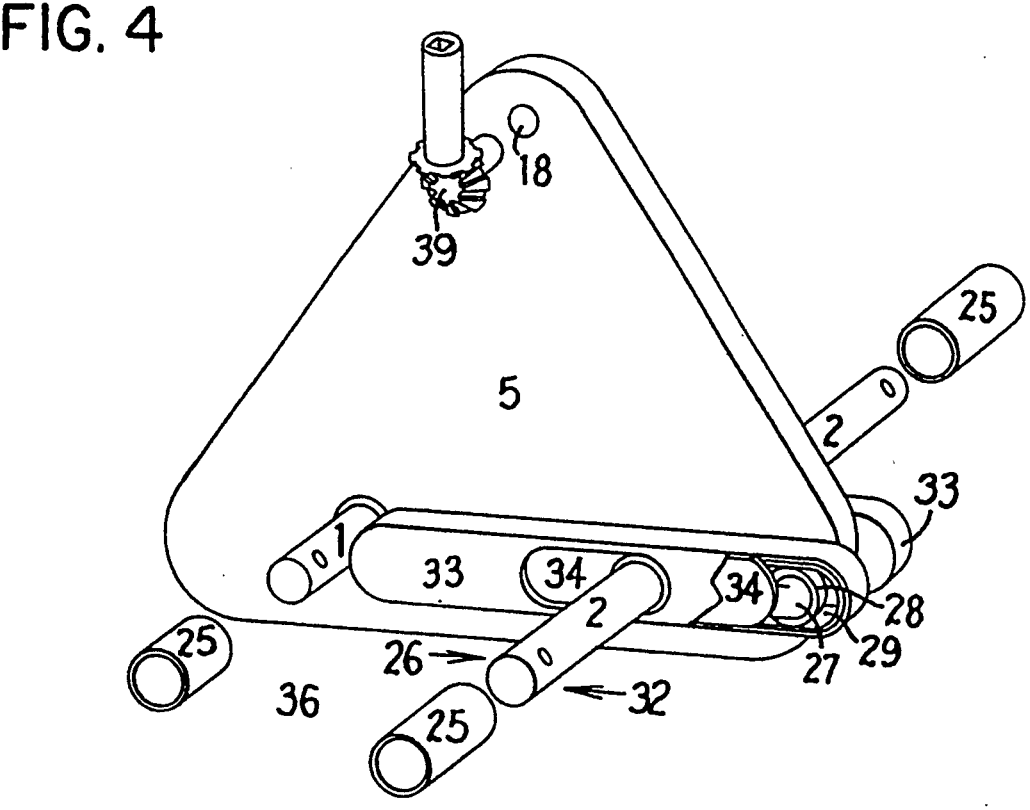
FIG. 4 shows the sliding track housed in a dust cover with a sliding cover diaphragm. Also shown are the shaft sleeves and a bevel-gear coupling.
Figure 5:
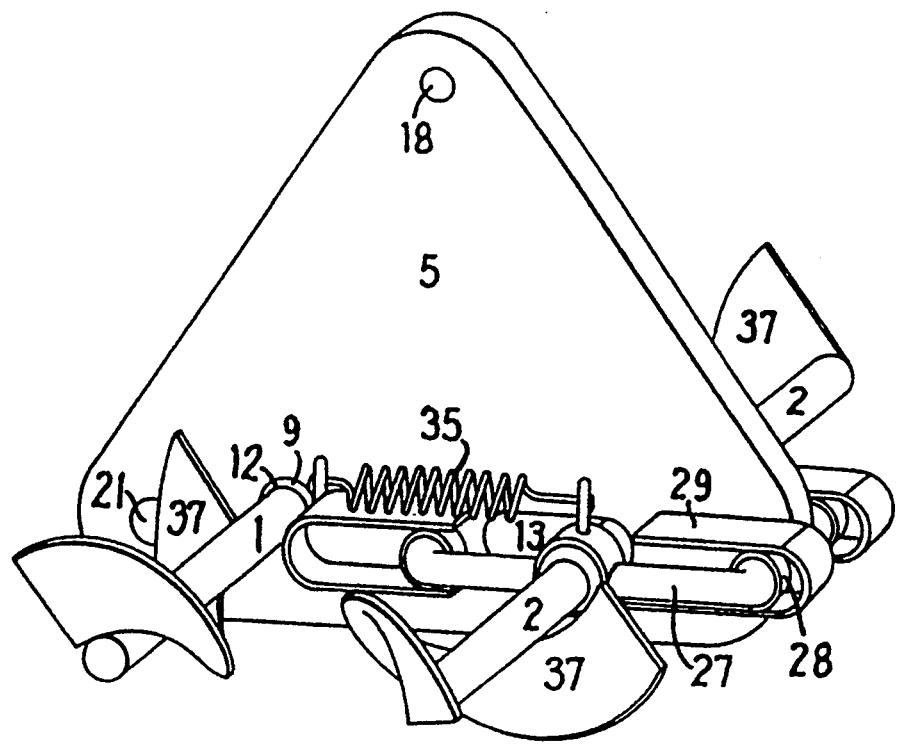
FIGS. 5 and 6 show on the shafts, helical auger blades with and without digging bits.
Figure 6:
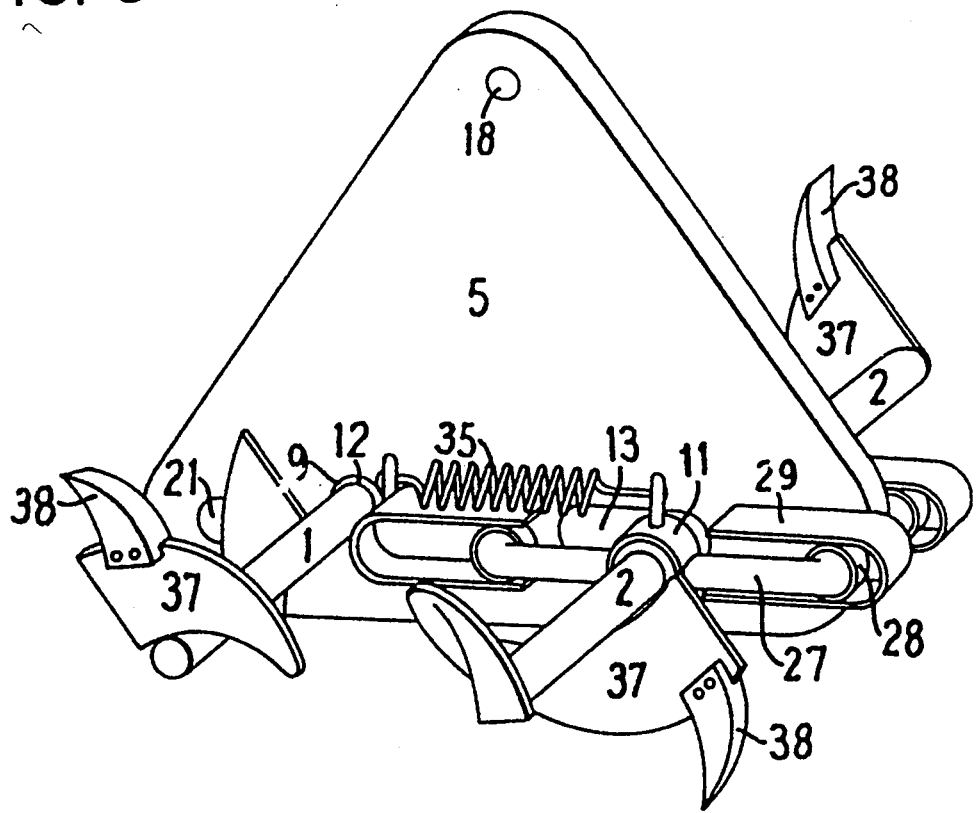

The tines 16, 17 are removably fixed on their respective shaft 1, 2 using nuts and bolts and their positions and the length of the shafts 1, 2 can vary as to provide the maximal ground coverage. For example, the two rear tines 17 can be placed wide apart, one near each end of shaft 2. The forward tines 16 can be positioned closer together, near the mid-section of shaft 1, or vice versa. Further, equal and adequate lateral spacing are provided for all tines so that they would not touch each other or any parts of the machine except the ground at all times. The shafts 1, 2 and their bearings 9, 11 are removably mounted on the side walls 3, 4 and the shafts 1, 2 can also be removed separately from their bearing 9, 11 by removing a washer and lock-pin for servicing or replacement of the tines with helical auger blades or other attachments. To reduce the tendency for the rotating shafts 1, 2, to pick up fibrous debris, stationary shaft sleeves 25 are provided to cover exposed shaft areas (FIG. 4).

The circumferential positions occupied by the tines 16 on shaft 1 can alternate with that of the opposing tines 17 on shaft 2. In this way, the outer edge of tines 16 can reach close to the center of rotational circle of the opposing tine 17, and vice versa. As the opposing tines 16, 17 rotate away from each other, they will clean each other of tangling weeds, debris etc. that are picked up from the soil while tilling the ground.

In the event that tines 16, 17 become plugged with debris or rocks, the inventive twin shaft system can be provided with a novel debris deflecting coil spring system. As shown in FIG. 17, a section of each of the shafts 1 and 2 between the tines 16, 17 facing side wall 3 of the transmission box 5 are surrounded by a coil spring 81 and 81A, respectively. The short arms 81B and 81C of the coil spring 81 and 81A are fixed onto the side wall 3. The long arm 82 of the coil spring 81 has an "L" shape. The long arm 82 extends backward and downward in the space between tine 16 and side wall 3 so that the arm 82 reaches straight back just enough to reach the outer perimeter of tine 16, whereat the arm 82 bent at an angle with its free end 82A pointing away from side wall 3 toward tine 17. As tine 16 rotates, the "L" shaped long arm 82 and 82A will be kept right against tine 16 without touching. Coil spring 81A is configured in a similar fashion around shaft 2. But its long arm 82 may be straight or "L" shaped. Some or all tines 16, 17 could be provided with such debris deflecting coil springs for guarding against debris or rocks from entering between the spaces between tines 16, 17, side walls 3, 4 and shafts 1, 2.

Due to counter-rotating action, a rock/hard matter may be caught between tine 16 and 17. In the absence of the sliding track (FIGS. 3, 4) or a mechanism for reversing rotational direction of shafts 1, 2 (FIG. 11, left), it is desirable to have a mechanism to disengage shaft 1 from sprocket 14 so that the tine 16 can be manually rotated in reverse direction, thus freeing up the rock/hard matter caught between tines 16, 17. To do this, a quick disengagement system can be provided. As shown in FIG. 18, inside the transmission box 5, sprocket 14 is mounted on the shaft 1 in such a way that it is free to slide along and rotate on the shaft 1. In side wall 4 is a recess 83. Facing the recess 83 in side wall 4 is the hub 14A of sprocket 14 that has a groove 84 formed therein. The groove is adapted to receive a pin 85 affixed on the shaft 1 so that when pin 85 is mated with groove 84, the shaft 1 will rotate in unison with the sprocket 14. On the opposite side of sprocket 14 facing side wall 3, a stop pin 86 is provided which passes through and is affixed to the shaft 1. In between the stop pin 86 and sprocket 14 is a compression spring 87 that exerts a constant push/force against the stop pin 86 and sprocket 14. Since the sprocket 14 can move along the shaft 1 but stop pin 86 cannot, the force is transmitted from the sprocket 14 to press the hub 14A against pin 85. If pin 85 is aligned with the groove 84, engagement occurs when sprocket 14 and shaft 1 rotate in unison; otherwise, they can rotate independently. To disengage sprocket 14 from the shaft 1 manually, a force 87A can be applied at the right side of the shaft 1. As the shaft 1 moves leftward, pin 85 will move out of groove 84 into the recess 83 because the sprocket 14 is kept at the same position by the rim of hub 14A touching the side wall 4. At the same time, spring 87 is compressed. Upon release of force 87A, the spring 87 will be allowed to expand thereby pulling the shaft 1 and pin 85 rightward. As the pin 85 presses on the sprocket hub 14A, engagement will occur as the sprocket 14 rotates until its groove 84 becomes aligned with pin 85. As the pin 85 again mates with the groove 84, the quick disengagement system is thus brought back into an operational mode.

Illustrated in FIGS. 20-22 is an improved tine 16, 17 that can be used with the inventive system, or with any conventional rototiller. This improved tine is made up of a flat, central hub portion 88 having a plurality of arms 89 extending radially outward therefrom. As the improved tine 16 is mounted in operational position, arms 89 point at an angle either toward or away from the ground. As shown in FIG. 20, a first segment 90 of each arm 89 is formed coplanar with central hub portion 88. A second planar segment 91 of each arm 89 is provided immediately adjacent to first arm segment 90 and disposed at an angle α of from 10 to 60 degrees with respect to the plane containing the first arm segment 90, with 30 degrees being preferred. A third planar segment 92 of each arm 89 is provided immediately adjacent to second arm segment 91 and disposed at an angle β of from 10 to 60 degrees with respect to the plane containing the second arm segment 91, preferably 60 degrees. The second and third arm segments 91, 92 are formed such that they either are directed upwardly or downwardly from the central hub portion 88 and form a pointed edge 93 which aids in rapid and deep ground penetration. The direction in which the second and third arm segments 91, 92 face on adjacent arms 89 can be the same or opposite. Additionally, the number of arms 89 provided on the tine 16, 17 is not critical.

Normally, the twin counter rotating shaft members 1, 2 and their respective tines 16, 17 are held in close juxtaposition facing each other without touching while rotating. This close configuration has the advantage of breaking up the dug up soil into fine consistency, but the chance of trapping rock/hard matter in between the counter rotating tines 16, 17 also increases. This problem can be resolved by permitting the rearwardly mounted shaft 2, its tines 17 and its sprocket member 15 to slide rearward 26 relative to the fix positioned counterparts 1, 16 and 14. The rearward sliding movement 26 can be achieved by mounting the ball bearing 11 on a sliding mechanism. For example, each ball bearing 11 can rest on the mid section of a supporting arm 27 positioned horizontally and perpendicularly to the long axis of shaft 2. Either end of arm 27 terminates in a ball bearing roller 28 which slides horizontally inside a sliding track 29 located on the side walls 3, 4. Since roller 28, arm 27, ball bearing 11 and shaft 2 are tightly interconnected forming one slidable unit, they are collectively referred to hereafter as the slidable unit. The sliding track 29 is constructed to allow only horizontal sliding of shaft 2 relative to the position of shaft 1, no lateral nor vertical movements of either shafts 1 or 2 are allowed at any time. Inside the transmission box 5, excess length of the chain 20 is provided to allow sprocket 15 to slide along aperture 13 freely with the slidable unit. To properly tension the chain 20 of excess length so that a firm engagement of chain 20 with all sprockets 14, 15, 19 can be maintained at all times, a tensioner 30, 31 can be used. The tensioner can be of any type such as in the form of a flat spring 30 whose one end is affixed to the wall of transmission box 5 facing the lower right side of sprockets 19 while its other end terminates in a roller 31. The tensioner 30, 31 exerts a constant force on chain 20 to keep it fully stretched and firmly engaged with the teeth of chain sprockets 14, 15, 19 at all times.

Therefore, with this or similar arrangements, shaft 2, while rotating, can also slide either forwardly 32 or rearwardly 26 for a distance as defined by sliding track 29. The components of the slidable unit can be comprised of any suitable parts and means as to provide maximal ease for shaft 2 to rotate and slide simultaneously in a manner just described. For example, each bearing 11 carrying the rearwardly mounted shaft 2 can be placed directly in the sliding track 29 without use of the arms 27 and roller 28. To prevent dust and debris from entering the sliding track 29 and the rollers 28, a dust cover 33 having a sliding cover diaphragm 34 or other appropriate sealing means can be used to cover these components. Other mechanisms allowing shaft 2 to slide rearward can be envisioned. For example, each end of shaft 2 can rest on a carrier hinged upon the side walls 3, 4 and will swing backwards and/or upwards if a rearward directed force is acted on shaft 2.

Normally, the slidable unit is held closest to shaft 1 by an extension spring 35 with adjustable force. One end of spring 35 is anchored on the side walls 3, 4 or the sliding track 29 and the other end is anchored on the supporting arm 27 or a stationary spot on ball bearing 11. If tines 17 dig into a hard ground or rock that generate a resistance force greater than the pull of springs 35, the spring will extend, allowing the slidable unit to slide rearwardly 26 along track 29; as new space 36 is created in between the juxtapositioned shafts 1 and 2, the tines 16, 17 can continue to rotate to eventually loosen the hard soil or eject the rock from between the counter-rotating tines 16, 17. Upon loosening of the hard ground or ejection of rocks caught between tines 16, 17, the slidable unit will automatically slide forward 32 along track 29 under the pull of the extension springs 35 to resume its original close juxtaposition with shaft 1. During transitional back 26 and forth 32 sliding movements, free rotation of shaft 1 and 2 and their respective tines 16, 17 or attachments will be maintained.

To increase flexibility, each shaft 1 or 2 can be fitted with a different set of attachments. For example, shaft 1 can be fitted with tines 16 whereas shaft 2 can be fitted with auger blades 37 with or without digging bits 38, and vice versa.

To work, the machine can be coupled to an engine or power source. For example, a large version of this machine can be driven by the engine of a lawn/garden tractor. Still larger version with extended shafts 1, 2 and multiple number of tines 16, 17 and/or auger blades 37, 38 can be driven by a farm tractor, or an engine of equivalent power for tilling of fields.

Figure 7A:
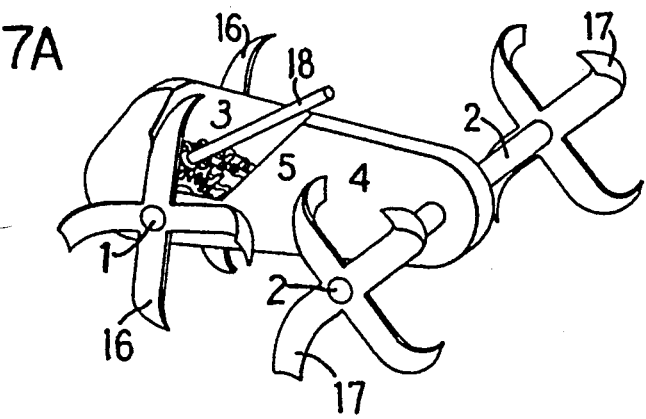
FIGS. 7A and 7B show small versions with an engine drive shaft either directly (top) or indirectly (bottom) driving the counter-rotating twin shafts.
Figure 7B:
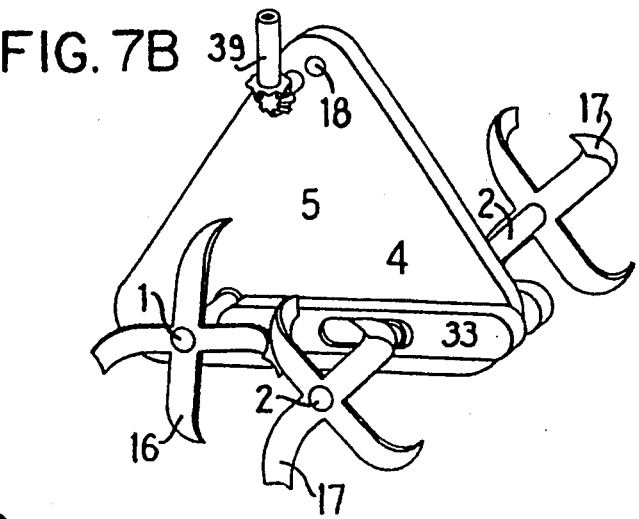

Conversely, a small version of the machine can be driven by a small hand-held engine or power source. For example, as illustrated in FIGS. 2 and 7A, with a small machine of this type, one of its shafts, 1 or 2, can be driven directly via a worm 23 and wormgears 24 coupling (FIGS. 2, 7A), or indirectly, via sprocket 19 (FIG. 1), with or without bevel gears 39 (FIG. 7B), by a conventional hand-held power implement T, such as a string trimmer or grass trimmer. More specifically, the hand-held power implement T includes an elongated handle H (FIG. 7A) inside of which is provided an elongated, rotatably supported shaft S coupled at one end to the drive shaft 18 by any conventional means and at the other end to a drive motor M. A theoretical midpoint P between the shafts 1 and 2 exists. If the axes of rotation of the shafts 1 and 2 are contained in a plane extending parallel to the ground surface and, if the counter rotating tines are of exact size and shape and have a similar degree of rotation, they will dig/till the ground/soil with equal but opposing force; and the forward digging force generated by the tines of the forwardly mounted shaft 1 will be cancelled by an equal, rearwardly directed digging force generated by the tines of the rearwardly mounted shaft 2. The balanced but opposed digging force generated by the counter rotating tines allows the machine to stay stationary while the ground/soil is being dug/tilled continuously beneath the machine. On the other hand, if the machine is tilted forward as by tilting the rearwardly mounted handle H upwards, the weight of the machine will be shifted forward allowing the tines of the forwardly mounted shaft 1 to dig deeper into the soil; the excess traction developed by these tines will overcome that of the rearwardly mounted tines, and the machine will move forward as at 6 instantly. Likewise, if the machine is tilted rearward as by lowering the rearwardly mounted handle H, the rearward traction will increase and the machine will move backward as at 7 instantly. The depth of ground digging and the speed of forward or backward movement 6, 7 can be readily controlled by the amount of upward or downward tilt of the handle H. If a constant advance of the machine in either direction is desired, the operator can adjust the handle height using a supporting mechanism (not shown) that moves along on the ground on a wheel.

In another embodiment, the tines 16 of shaft 1 and that 17 of shaft 2 can be replaced respectively by a spiked roller 40 and a shearing reel 41 for simultaneous de-thatching and mowing of lawn grass.

Figure 8:
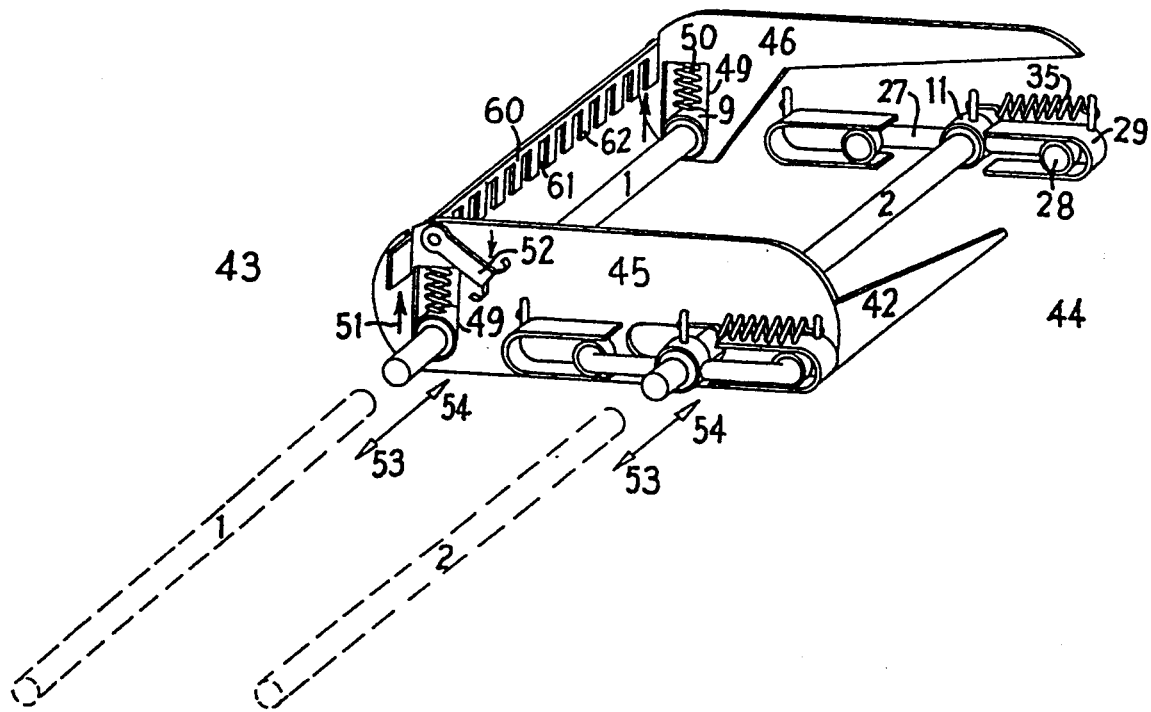
FIG. 8 shows the twin shafts mounted on the side walls in a housing where vertical motion is allowed for the front shaft and a comb-like bar structure for cleaning of thatch-debris from the spiked roller is in place.

FIGS. 8 through 13 show the twin shafts 1, 2, being mounted transversely thereof inside the housing 42 relative to the forward 43 and rearward 44 direction of machine travel; shaft 1 is mounted forwardly and shaft 2, positioned parallel lengthwise, is mounted rearwardly on the walls 45, 46 on opposite sides of the housing 42. Shaft 1 rotates 47 freely on a ball bearing 9 one in each side wall 45 or 46 and shaft 2 rotates 48 freely on a similar ball bearing 11 in the side walls 45, 46. Preferably, shaft 1 can have some vertical movement. This can be done by allowing shaft 1 to slide upwards 51 in a sliding slot 49, one in each housing wall 45, 46 against the force of a compression spring 50 (FIG. 8). This will allow the spiked roller 40 to ride on the contour of the ground as it travels. If vertical motion of shaft 1 is not desired, a slap-on lock 52 will prevent shaft 1 from having the vertical motion. Further, shaft 1 and 2 can be withdrawn from 53 or inserted into 54 the bearings 9, 11 in the side walls 45, 46 (FIG. 8).

As viewed from the rearward direction 44, shafts 1, 2 extend through an aperture 12, 13 respectively in the side wall 45 into the bottom portion of a triangularly shaped transmission box 5. Aperture 13 is elongated horizontally. Inside the transmission box 5, shaft 1 and 2 terminate respectively in sprockets 14 and 15, both having a similar or different diameter. Rotation of sprockets 14, 15 cause rotation of shaft 1 and 2 and the respective spiked roller 40 and shearing reel 41 affixed thereupon. At the top of said transmission box 5 and generally parallel to shafts 1, 2, the drive shaft 18 is connected to an engine 55. The drive shaft 18 terminates in a smaller sprocket 19. All sprockets 14, 15, 19 are linked in the box 5 by a drive chain 20. To create counter-rotational movement between sprockets 14 and 15, drive chain 20 winds circumferentially around the opposite sides of sprocket members 14, 15. Therefore, from the side wall 45 on the left looking into the transmission box 5, the drive chain 20 winds around the teeth of sprocket 15 at the top, right, bottom and lower left circumference, then it reverses its direction by winding around the teeth on the opposite side of sprocket 14 at its top, left and lower left circumference. In order to keep the chain 20 firmly engaged with sprocket 14 at all times, a pulley idler 21 is used to hold the chain 20 in place against the left and lower left circumference of sprocket 14 and the pulley idler 21 is rotatably mounted on the side wall 4 of transmission box 5. After chain 20 leaves the pulley idler 21, it is engaged with the sprocket 19 on the engine drive shaft 18 for completion of a drive cycle 22. This way, anti-clockwise rotation 57 of the engine drive shaft 18 will drive the rearwardly mounted shaft 2 and its shearing reel 41 to rotate anti-clockwise 48, but the forwardly mounted shaft 1 and its spiked roller 40 to rotate in the exact opposite, clockwise direction 47 as defined by the direction of drive chain 20 movement 57. In this way, the spiked roller 40 and the shearing reel 41 move away from each other at the ground level.

The spiked roller 40 can be shaft 1 with spring-loaded spikes 58 affixed to it. The spikes 58 can be made of flexible steel and can be arranged on the roller 40 outer surface in spiraling fashion 59. The spiral arrangement 59 of spikes 58 will facilitate debris to be moved to one side of the machine. To remove thatch that got stuck on the spikes 58, a stationary comb-like bar 60 is placed lengthwise above the spiked roller 40 such that as the roller 40 rotates, its spikes 58 pass through the openings 61 between the teeth 62 of the comb-like bar 60 which traps the thatch/debris, preventing the latter from entering into the machine housing 42.

The shearing reel 41 and bedknife 41A are of conventional type except that the bedknife can be impregnated with abrasive material such as silicon carbide for self sharpening of the blades on the shearing reel 41 as it rotates.

If reversal of direction in counter-rotation is desired, as in the case where the spiked roller 40 and shearing reel 41 on shafts 1, 2 are replaced by tines 16, 17 for ground tilling work, a gear mechanism for direction reversal can be used (FIG. 11, left). This can be accomplished by engaging the teeth of two gear wheels 63, 64 whose shaft 18 or 65 also carries sprocket 19 or 66. A space 67 equal to the width of the drive chain 20 is provided between sprocket 66 and its gear wheel 64. In this way, as gear wheel 63 is driven to rotate clockwise 68, gear wheel 64 will rotate counter-clockwisely 69, and depending on which sprocket, 19 or 66, that the drive chain 20 is engaged with, the direction of chain travel 57 can be reversed. To select sprockets 19, 66 for chain 20 engagement, the chain 20 can be lifted above the sprockets 19, 66 and moved to above the desired sprocket before lowering it for engagement.

To facilitate grass mowing and mulching, a blower fan with mulching capability is installed (FIG. 11, right). This blower and mulching fan blade 70 is enclosed in a short metal tube 71 of suitable dimension to be mounted on the side wall 45 or 46 or at the top of the machine housing 42. The fan blade 70, preferably made of thick metal, is driven to rotate 72 centripetally inside the tube 71 by a drive shaft 73 that is coupled to one of the twin shafts 1 or 2 through a belt-pulley system 74. The outer edge 75 of the fan blade 70 running perpendicular to drive shaft 73 is sharpened, serving as a shearing edge 75. Positioned parallel lengthwise to the shearing edge 75 of the fan blade 70 is a bedknife 76 provided through rectangular holes 77 in the tube 71 immediately in front of the fan blade 70. The position of the bedknife 76 in front of the fan blade 70 can be adjusted as to provide maximal efficiency for grass shearing and mulching. As the fan blade 70 is driven to rotate 72, suction 78 is created and grass clippings are sucked into the tube 71 where it is sheared/mulched by the shearing edge 75 of the rotating fan blade 70 against the shearing edge 79 of the stationary bedknife 76. The sheared off grass clippings are carried by air current 80 to outside of housing 42, or back into housing 42 for further shearing- /mulching. To clear away debris (e.g. rocks, tree branches etc.) caught between the rotating fan blade 70 and bedknife 76, or to eliminate shearing/mulching action, the bedknife 76 can be pulled out or retracted from its holes/tracks 77 in the tube 71. To facilitate smooth grass shearing action, the fan blade 70 can be "S" shaped. Either or both of the fan blade 70 and/or bedknife 76 can be made of materials (e.g. steel) impregnated with abrasive materials such as silicon carbide for automatic sharpening of their shearing edges 75, 79. The shape and number of bedknife and shape of the fan blade can vary as to provide maximal efficiency for grass shearing and mulching.

This blow fan with a shearing fan blade 70 and a removable bedknife 76 can be readily installed on a conventional rotor blade type lawn mower or a reel type lawn mower for vacuuming and mulching of grass clippings.

Therefore, the first embodiment having a centrally located transmission box 5 and counter-rotating twin shafts 1, 2 with attachments (tines 16, 17 and/or auger blades 37 with or without digging bits 38) extending from both sides of the box 5, can be readily adapted to existing power machines for ground tilling and weeding, and very large models for tilling of fields in agricultural works. The second embodiment, with the counter-rotating twin shafts 1, 2 mounted on the machine housing 42, can be converted to perform a number of functions simply by replacing different sets of attachments. If tines 16, 17 are installed on the twin shafts 1, 2, soil tilling can be done, if auger blades 37 with or without digging bits 38 are in place instead, the machine can simultaneously till and remove soil or remove snow if wheels are provided, if the front shaft 1 is installed with a spiked roller 40 and the rear shaft 2, with a shearing reel 41, then the machine can dethatch and mow grass at the same time, and an additional grass clipping mulching ability can be gained if a fan blower is equipped with a mulching fan blade 70 and a retractable knife 76.

The embodiments of the invention in which an exclusive property or privilege is claimed are defined as follows:

1. A counter rotating twin shaft gardening system comprising:
   two shafts rotatably mounted on a frame, one of said two shafts being mounted forward of the other of said two shafts;
   a driven member provided on each of said two shafts, said shafts being drivingly connected together to rotate in directions opposite to each other;
   one of a material working device and a material shearing device connected with at least one of said two shafts; and
   a driving shaft operatively connected to drive each said driven member.

2. The gardening system of claim 1, wherein said driving shaft is connected to drive each said driven member with a drive chain, and wherein each said driven member on each of said two shafts is a cooperating drive sprocket engaging said drive chain so one of said two shafts rotates in a first direction and the other of said two shafts rotates in a direction opposite to said first direction.

3. The gardening system of claim 1, wherein said driving shaft is connected to drive each said driven member with a worm shaft, and wherein said driven members on each of said two shafts are cooperating worm wheels engaging said worm shaft so said worm wheels and said two shafts rotate in directions opposite to each other.

4. The counter rotating twin shaft gardening system of claim 1, wherein said driving shaft is connected to directly drive one of said two shafts.

5. The counter rotating twin shaft gardening system of claim 1, wherein said driving shaft is coupled to a power source which is one of an internal combustion engine and an electric motor and has a 6. The counter rotation twin shaft gardening system of claim 1, wherein one of said material working device is affixed to each of said two shafts.

7. The counter rotation twin shaft gardening system of claim 6, wherein said material working device includes at least one helical auger blade with removable digging bits to dig and transport material.

8. The counter rotation two shaft gardening system of claim 6, wherein said material working device is self cleaning.

9. The counter rotating twin shaft gardening system of claim 1, wherein one of said two shafts has a material shearing device affixed thereto, said material shearing device having a housing, having a shearing reel rotatably mounted on said housing, and having a cooperating bedknife mounted on said housing to shear grass with said shearing reel, and wherein said gardening system has wheels supporting said gardening system.

10. The counter-rotation twin shaft gardening system of claim 9, wherein a material working device is affixed to the other of said two shafts, said material working device having spring-loaded spike means for power raking and de-thatching.

11. The counter-rotation twin shaft gardening system of claim 10 further including comb means for cleaning said spike means.

12. The counter-rotation twin shaft gardening system of claim 9, wherein at least one of said shearing reel and said bedknife is impregnated with abrasive matter for self-sharpening.

13. The counter rotating twin shaft gardening system of claim 9 further including a fan blower operatively connected with said driving shaft and in fluid communication with said housing to create a flow of air and sheared material from said housing.

14. The gardening system of claim 1, wherein said driving shaft is connected to a first shaft of said two shafts with a worm shaft and a cooperating worm wheel engaging said worm shaft to drive said first shaft in a first direction, and wherein said first shaft and the other of said two shafts are drivingly connected together with a drive chain and cooperating drive sprockets to rotate said other of said two shafts in a second direction, opposite said first direction.

15. The gardening system of claim 1, wherein said material working device has at least one digging member, said digging member having a hub portion and a plurality of arms extending generally radially outward from said hub portion, said hub portion generally defining a reference plane, at least one arm of said plurality of arms having a first segment oriented generally coplanar with said hub portion, having a second segment oriented at an angle relative to said first segment, and having a third segment oriented at an angle relative to said second segment.

16. The gardening system of claim 15, wherein said second segment is oriented at an angle of about from ten to sixty degrees away from a position coplanar with said first segment and wherein said second segment deflects material away from said digging member in a direction generally normal to said hub portion.

17. The gardening system of claim 16, wherein said third segment is oriented at an angle of about ten to sixty degrees away from a position coplanar with said second segment and wherein said third segment digs into and breaks apart material.

18. A counter rotating twin shaft gardening system comprising:
   two shafts rotatably mounted on a frame, one of said two shafts being mounted forward of the other of said two shafts;
   a driven member provided on each of said two shafts, said two shafts being drivingly connected together to rotate in opposite directions;
   one of shearing means for cutting material or digging means for digging material, directly affixed to at least one of said two shafts;
   a driving power source drivingly connected to drive each said driven member; and
   gear means operably connected with each of said two shafts for reversing the direction of counter-rotation between said two shafts.

19. A counter rotating twin shaft gardening system comprising:
   two shafts rotatably mounted on a frame, said two shafts being mounted in forward and backward spaced relation to one another;
   a driven member provided on each of said two shafts, said two shafts being drivingly connected together to rotate in opposite directions;
   shearing means for cutting material, directly affixed to one of said two shafts, said shearing means having a housing, having a shearing reel rotatably mounted on said housing, and having a cooperating bedknife mounted on said housing to shear grass with said shearing reel;
   digging means for digging material, directly affixed to the other of said two shafts, said digging means having spring-loaded spike means for power raking and de-thatching and having sliding tracks extending generally vertically, said spike means being mounted in said sliding tracks to slide generally vertically relative to said frame, said material working device further including spring means for holding said spike means at a predetermined position;
   a driving power source drivingly connected to drive each said driven member; and
   wheels supporting said gardening system.

20. A counter rotating twin shaft gardening system comprising:
   two shafts rotatably mounted on a frame, said two shafts being mounted in forward and backward spaced relation to one another;
   a driven member provided on each of said two shafts, said two shafts being drivingly connected together to rotate in opposite directions;
   shearing means for cutting material, directly affixed to one of said two shafts, said shearing means having a housing, having a shearing reel rotatably mounted on said housing, and having a cooperating bedknife mounted on said housing to shear grass with said shearing reel, said shearing means further including spring means for holding a shearing edge of said shearing reel against a shearing edge of said bedknife;
   one of said shearing means a digging means for digging material, or no means for shearing or digging directly affixed to the other of said two shafts;
   a driving power source drivingly connected to drive each said driven member; and
   wheels supporting said gardening system.

21. A counter rotating twin shaft gardening system comprising:
   two shafts rotatably mounted on a frame, one of said two shafts being mounted forward of the other of said two shafts;
   a driven member provided on each of said two shafts, said two shafts being drivingly connected together to rotate in opposite directions;
   shearing means for cutting material, directly affixed to one of said two shafts, said shearing means having a housing, having a shearing reel rotatably mounted on said housing, and having a cooperating bedknife mounted on said housing to shear grass with said shearing reel;
   one of said shearing means, a digging means for digging material, or no means for shearing or digging directly affixed to the other of said two shafts;
   a driving power source drivingly connected to drive each said driven member;
   wheels supporting said gardening system; and
   a fan blower driven by one of said two shafts and in fluid communication with said housing to create a vacuum flow from said housing, said fan blower having fan blades with shearing edges in contact with a fan bedknife to mulch sheared material, said fan bedknife being retractable for de-clogging.

22. The counter rotating twin shaft gardening system of claim 21, wherein at least one of said fan blades or said fan bedknife is made of steel impregnated with abrasive materials for self-sharpening.

23. A counter routing twin shaft gardening system comprising:
   two shafts routably mounted on a frame, one of said shafts being mounted forward of the other shaft;
   a driven member provided on each of said two shafts, said shafts being drivingly connected together so said two shafts route in directions opposite to each other;
   a ground working device directly affixed to each of said two shafts and rotated in opposite directions with said two shafts; and
   a driving power source drivingly connected to drive each said driven member; and
   wherein, said two shafts define a reference plane, and whereby tilting said reference plane to a first rotational orientation relative to a ground surface causes said ground working device on each of said two shafts to work the ground surface with equal but opposing forces, and whereby a rocking of said reference plane to a second rotational orientation relative to the ground surface causes said ground working device on one of said two shafts to work the ground surface with a greater force than the other of said two shafts to thereby cause a movement of said gardening system along the ground surface.

* * * * *

UNITED STATES PATENT AND TRADEMARK OFFICE
CERTIFICATE OF CORRECTION

PATENT NO. : 5,353,881
DATED : October 11, 1994
INVENTOR(S) : Kai S. Lee et al.

It is certified that error appears in the above-indentified patent and that said Letters Patent is hereby corrected as shown below:

Column 10, line 10;
  After "has a" insert --power output capacity in the range of from a hand-held power tool to commercial agricultural equipment, inclusively.--.

Column 12, line 39, claim 23;
  "routing" should be --rotating--.

Column 12, line 41, claim 23;
  "routably" should be --rotatably--.

Column 12, line 45, claim 23;
  "route" should be --rotate--.

Signed and Sealed this

Eleventh Day of July, 1995

*Attest:*

BRUCE LEHMAN

*Attesting Officer*  *Commissioner of Patents and Trademarks*